United States Patent
Mirzaei Domabi et al.

(10) Patent No.: US 11,436,704 B2
(45) Date of Patent: Sep. 6, 2022

(54) WEIGHTED NORMALIZED AUTOMATIC WHITE BALANCING

(71) Applicant: NVIDIA Corporation, Santa Clara, CA (US)

(72) Inventors: Hamidreza Mirzaei Domabi, Mountain View, CA (US); Eric Dujardin, San Jose, CA (US); Animesh Khemka, Fremont, CA (US); Yining Deng, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/742,322

(22) Filed: Jan. 14, 2020

(65) Prior Publication Data
US 2020/0226720 A1    Jul. 16, 2020

Related U.S. Application Data

(60) Provisional application No. 62/792,225, filed on Jan. 14, 2019.

(51) Int. Cl.
*G06K 9/00* (2022.01)
*G06T 5/00* (2006.01)
(Continued)

(52) U.S. Cl.
CPC .............. *G06T 5/001* (2013.01); *B60R 11/04* (2013.01); *G05B 13/027* (2013.01);
(Continued)

(58) Field of Classification Search
CPC . G06T 5/001; G06T 7/90; G06T 2207/10144; G06T 2207/20208;
(Continued)

(56) References Cited

U.S. PATENT DOCUMENTS 10,885,698 B2    1/2021  Muthler et al.
10,897,578 B2 *  1/2021  Novikov ................ H04N 5/361
(Continued)

FOREIGN PATENT DOCUMENTS

EP    2582125 A1    4/2013

OTHER PUBLICATIONS

International Search Report and Written Opinion in International Patent Application No. PCT/US2020/013510 filed Jan. 14, 2020.
(Continued)

*Primary Examiner* — Charlotte M Baker
(74) *Attorney, Agent, or Firm* — Taylor English Duma LLP

(57) ABSTRACT

In order to more accurately white balance an image, weightings can be determined for pixels of an image when computing an illuminant color value of the image and/or a scene. The weightings can be based at least in part on the Signal-to-Noise Ratio (SNR) of the pixels. The SNR may be actual SNR or SNR estimated from brightness levels of the pixels. SNR weighting (e.g., SNR adjustment) may reduce the effect of pixels with high noise on the computed illuminant color value. For example, one or more channel values of the illuminant color value can be determined based on the weightings and color values of the pixels. One or more color gain values can be determined based on the one or more channel values of the illuminant color value and used to white balance the image.

20 Claims, 11 Drawing Sheets

(51) Int. Cl.
*G06T 7/90* (2017.01)
*G05B 13/02* (2006.01)
*G06N 3/04* (2006.01)
*G05D 1/00* (2006.01)
*G05D 1/02* (2020.01)
*B60R 11/04* (2006.01)

(52) U.S. Cl.
CPC ......... *G05D 1/0088* (2013.01); *G05D 1/0251* (2013.01); *G05D 1/0253* (2013.01); *G06N 3/04* (2013.01); *G06T 7/90* (2017.01); *G05D 2201/0213* (2013.01); *G06T 2207/10144* (2013.01); *G06T 2207/20208* (2013.01); *G06T 2207/30252* (2013.01)

(58) Field of Classification Search
CPC . G06T 2207/30252; G06T 2207/10024; G06T 5/007; B60R 11/04; G05B 13/027; G05D 1/0088; G05D 1/0251; G05D 1/0253; G05D 2201/0213; G05D 1/0248; G06N 3/04; G06N 3/063; G06N 3/0454; G06N 3/08; H04N 9/735
USPC ................. 382/104, 266, 224, 275; 358/516
See application file for complete search history.

(56) References Cited

U.S. PATENT DOCUMENTS

2003/0161545 A1* 8/2003 Gallagher ............... G06T 5/004
382/266

2003/0194127 A1 10/2003 Hubel et al.
2010/0245618 A1 9/2010 Ajito

OTHER PUBLICATIONS

Finlayson, Graham D., and Elisabetta Trezzi. "Shades of gray and colour constancy." In Color and Imaging Conference, vol. 2004, No. 1, pp. 37-41. Society for Imaging Science and Technology, 2004.
International Preliminary Report on Patentability received for PCT Application No. PCT/US2020/013510, dated Jul. 29, 2021, 11 pages.
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-3 5 (Jun. 15, 2018).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

* cited by examiner

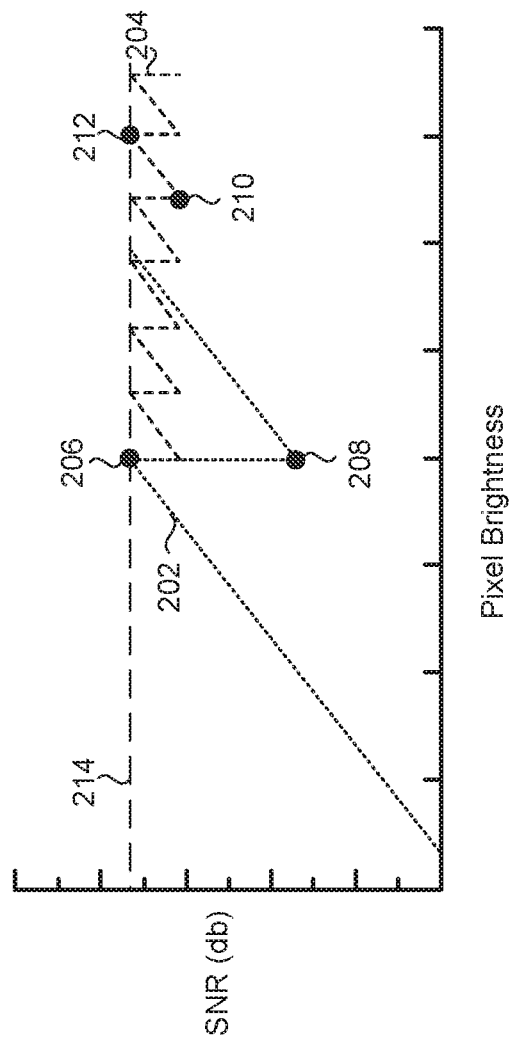

WEIGHTED NORMALIZED AUTOMATIC WHITE BALANCING

CROSS-REFERENCE TO RELATED APPLICATIONS

This application claims the benefit of U.S. Provisional Application No. 62/792,225, filed on Jan. 14, 2019, which is hereby incorporated by reference in its entirety.

BACKGROUND

A change in a scene's illumination (e.g., under a red light or under a green light) can have a significant effect on how a computing system perceives wavelengths of light reflected from an object (i.e., an object's color(s)) within the scene. Because humans naturally perceive object colors as if they were illuminated by a neutral illuminant (rather than a colored light), these changes are largely discounted by the human visual system. This perception is referred to as color constancy. However, camera systems do not automatically perceive changes in illumination in the same manner as the human visual system. This can lead to issues in camera systems that rely on image-based analysis. The robustness of such platforms may be highly dependent on the stability of images with regard to shadows, weather, and lighting conditions. As such, image data may need to be adjusted to compensate for changes due to illumination.

To compensate for changes due to illumination and determine illuminant-independent color(s) of objects (e.g., color constancy), conventional systems rely on automatic white balance methods that apply the gray-world theory (also referred to as a gray-world method). A central premise behind this theory is that averaging all colors of a normal and well color-balanced image will result in a neutral gray color. An advantage of using a method based on the gray-world theory is that it is often computationally inexpensive and straightforward to implement. Furthermore, it can be easily combined with other methods for further image manipulation.

Conventional systems that rely on algorithms based on the gray-world theory often estimate an illuminant of an image (e.g., a scene) by finding a Minkowski norm of each color channel. From the Minkowski norm, an illuminant colorcast (e.g., a particular color that affects the whole, or a portion, of an image evenly) can then be estimated by comparing the average of the channels to gray. Such colorcasts can then be modified or removed to normalize the image. However, these gray-world methods are not able to meet the needs for High-Dynamic-Range Imaging (HDRI) due to an increased range of pixel values in HDR images. For instance, a single pixel in conventional HDRI implementations can disproportionately and inaccurately bias the overall average towards the color of that pixel (due to the extended range of potential color values), whereas the overall scene might not be of that color. Therefore, conventional gray-world methods often lead to incorrect estimation of the overall color tendency of the scene and consequently fail to correctly adjust the image for illumination. Such failure of gray world-based methods (e.g., gray-world, gray edge, second order gray edge, shades of gray, and general gray world, etc.) may be due to the bias of the results towards the highlights of the image.

SUMMARY

Embodiments of the present disclosure relate to techniques that can be used for more accurately white balancing an image. In particular, the techniques may be used for normalizing illuminance while overcoming potential bias from highly lit pixels in images (e.g., HDR images).

Rather than relying on conventional gray-world methods for white balancing an image, various embodiments may scale and weight (e.g., adjust) pixel values based on importance and/or reliability. In particular, weighting can be applied to pixel values in any manner that will reduce bias in the system. The white balancing information may be used to not only reduce bias from particular pixels but also increase accuracy (e.g., reliability) of the adjusted images. Upon undergoing white balancing, the image may be deployed in autonomous vehicle applications, or other such machine-vision or image processing applications.

Non-limiting embodiments may include determining weightings for pixels of an image. The weightings can be based at least in part on the Signal-to-Noise Ratio (SNR) values of pixels and/or brightness levels of the pixels. For example, pixel brightness in an image may be used as an estimate of SNR values used to determine the weightings or the SNR values may be provided by a device that captured the image. SNR weighting (e.g., SNR adjustment) may reduce the effect of pixels with high noise in computing an illuminant color value of the image. For example, one or more channel values of an illuminant color value of the pixels can be determined based on the weightings and the color values of the pixels. To determine how much to adjust image color (e.g., for white balancing), one or more color gain values can be determined based on the one or more channel values of the illuminant color value.

BRIEF DESCRIPTION OF THE DRAWINGS

The present systems and methods for weighted normalized automatic white balancing is described in detail below with reference to the attached drawing figures, wherein:

FIG. 2A shows example SNR values corresponding to pixel brightness values of image data, in accordance with some embodiments of the present disclosure;

DETAILED DESCRIPTION

Figure 1:
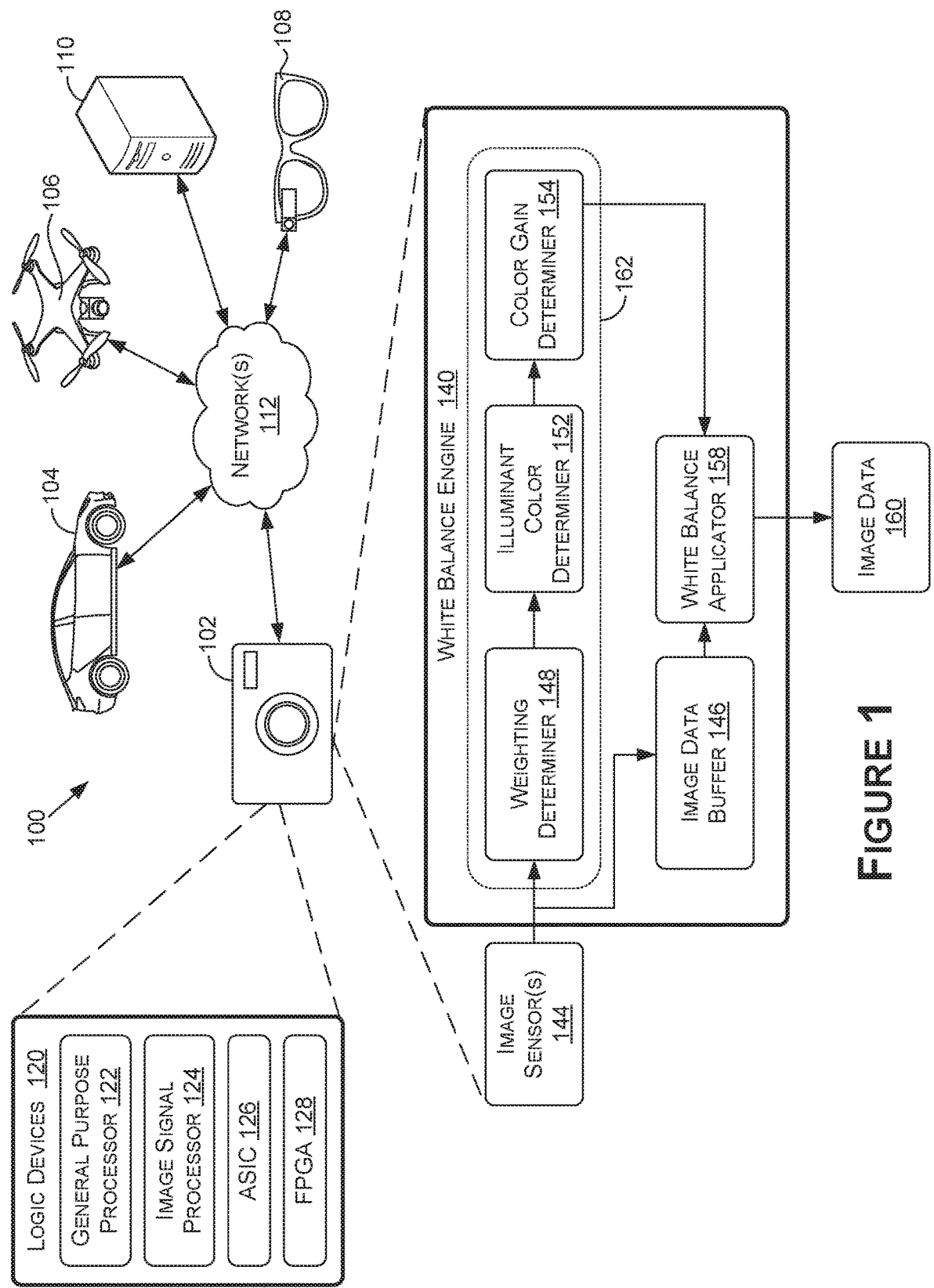
FIG. 1 provides a schematic diagram of an example imaging system, in accordance with some embodiments of the present disclosure.

Systems and methods are disclosed that are related to weighted normalized automatic white balancing. More specifically, the embodiments herein relate to more accurately white balancing images by accounting for potential bias in pixel colors.

In contrast to conventional gray world-based approaches, the present disclosure provides techniques that can be used for more accurately white balancing an image. In particular, the disclosure provides techniques for weighted normalizing of illuminance to overcome bias from potential highly lit (exposed) pixels in images (e.g., HDR images). These techniques may be established using a modified Minkowski norm for object colors. For instance, to account for bias towards colors of certain pixels in HDR images, techniques may be used that scale and weight (e.g., adjust) pixels based on importance and/or reliability. In various embodiments, the techniques may determine the chromaticity of a pixel and then apply a weight to it (e.g., in computing the scene norm using weighted channel averages). For instance, chromaticity can be represented using Equations (1), (2), and (3):

$$r_n = \frac{R_n}{Brightness_n}$$ Equation (1)

$$g_n = \frac{G_n}{Brightness_n}$$ Equation (2)

$$b_n = \frac{B_n}{Brightness_n}$$ Equation (3)

where red channel chromaticity $r_n$, green channel chromaticity $g_n$, and blue channel chromaticity $b_n$ form chromaticity $C_n$ at the $n^{th}$ pixel, $Brightness_n$ is the brightness at the $n^{th}$ pixel; and red channel color $R_n$, green channel color $G_n$, and blue channel color $B_n$, form a color value at the $n^{th}$ pixel.

The present disclosure provides a generic formulation that can reduce bias and increase reliability (e.g., accuracy) of images for auto white balance. Weighting can be applied in any manner that will reduce bias in the system. For example, a standard deviation or other form of image analysis can be used to identify pixels that should be weighted to reduce bias. In one or more embodiments, all pixels may be weighted. Weighting can be applied in any manner to limit the impact of outlier pixels (e.g., pixels with color values representative of highly lit areas in an image, also referred to as highlight values) rather than merely excluding such outliers. For example, a generic formulation (e.g., that can be used to apply the weighting technique to modify any type of gray-world algorithm) can be defined using Equation (4) below:

$$W_n(R_n G_n B_n) = 1/\text{sum}(R_n G_n B_n)$$ Equation (4)

where Wn is a weight for the $n^{th}$ pixel.

Weighting can also be based at least in part on the Signal-to-Noise Ratio (SNR) of pixels. SNR weighting (e.g., SNR adjustment) may reduce the effect of pixels with high noise. Weighting pixels based on SNR may not only reduce bias but also increase accuracy (e.g., reliability) of the adjusted images. For instance, SNR values can be used to rescale super bright RGBs (e.g., pixels with highlight values). This rescaling can adjust pixels with highlight values to a lower light value. In embodiments, this lower light value can be formatted to the same level as a corresponding Low Dynamic Range (LDR) or Standard Dynamic Range (SDR) image.

HDR images can be generated using multiple (e.g., two or more) captured LDR/SDR images/exposures of the same scene, with separate exposure settings or periods for each of the multiple LDR/SDR images. In particular, an HDR image can be generated by combining or blending pixel values of multiple LDR/SDR images. For example, a determination of an HDR image's pixel values for the darker regions of an imaged scene may be dominated by the corresponding pixel values of LDR or SDR images with longer exposure times. Using the pixel values generated by longer exposure times may enable more detail to be captured in images and increase contrast in the darker regions of the scene. However, the HDR pixel values determined for the lighter regions of the scene may result in a high bias. In some embodiments, rescaling pixels with highlight values can prevent a "washout" or over-exposed effect on the lighter or brighter regions of the scene when white balancing the image.

In some embodiments, actual values of the SNR of pixels can be used as SNR values in weighting (actual SNR). An actual value of the SNR can be determined based on data provided by the camera device that captured the image. For instance, an HDR image can be generated from a camera device and the SNR for particular pixels may be computed or determined from data provided by a camera device (e.g., a photo sensor of the camera device).

In embodiments, in addition to or instead of actual SNR being used as SNR values, estimates of the SNR of pixels can be used in weighting (e.g., estimated SNR). These estimates of the SNR for pixels can be based on the brightness of the pixels. In a dual exposure HDR image, the SNR can rise relative to the brightness of a pixel and then suddenly dip for pixels where the short exposure starts to contribute. This dip occurs in the same manner during the short exposure(s) in additional (e.g., triple) exposure HDR images. As such, brightness can be used to effectively estimate actual SNR. As an example, the estimated SNR $eSNR_n$ at the $n^{th}$ pixel can be estimated using Equation (5), below:

$$eSNR_n(R_n G_n B_n) = \begin{cases} Brightness_n & Brightness_n < max_{snr} \\ max_{snr} & Brightness_n \geq max_{snr} \end{cases}$$ Equation (5)

where $max_{snr}$ may refer to a threshold SNR value, and in this example a maximum SNR value. Averaging pixel colors of an image to determine the illuminant color value may include $C_n \times eSNR_n$ (or SNR where actual SNR is used). Therefore, using the definition of $eSNR_n$ of Equation (5), a weight $W_n$ for the $n^{th}$ pixel can be determined (e.g., for each pixel), as following using Equation (6), with respect to the initial red, green, and blue values of pixels:

$$W_n(R_n G_n B_n) = \begin{cases} 1 & Brightness_n < max_{snr} \\ max_{snr}/Brightness_n & Brightness_n \geq max_{snr} \end{cases}$$ Equation (6)

In various embodiments, the brightness Brightness$_n$ at each given pixel n can be determined using Equation (7), below:

$$\text{Brightness} = (a_r R_n + a_g G_n + a_b B_n) \qquad \text{Equation (7)}$$

where $a_r$, $a_g$, and $a_b$ can be weights for different channels used to calculate the brightness at the $n^{th}$ pixel.

Thus, weighting can be determined for pixels to reduce bias and increase reliability (e.g., accuracy) of images for auto white balancing images. In particular, weights can be determined based on the SNR of the pixels using actual or estimated SNR values, as discussed above. For instance, upon determining brightness, weights can be determined and applied. Weighting can then be applied to pixels that are determined to have light values (e.g., brightness) above a predefined threshold, for example, as defined by Equation (6). For instance, the predefined threshold (e.g., $\max_{snr}$) can be based on the capabilities of a camera device that captured the image (e.g., a photo sensor of the camera device). Such a predefined threshold can be based on the maximal capturing capabilities of a photo sensor of the camera device (e.g., 12 bits). This predefined threshold can be applied to the SNR from combined exposure(s) used to generate an HDR image. When the brightness of a pixel is below the threshold value, the weight of the SNR can be set to one (e.g., such that the pixel value is not adjusted for bias). When the brightness of a pixel is above the threshold value, the weight of the SNR can be the maximal SNR divided by the SNR value (e.g., actual SNR or brightness) of the pixel (e.g., such that the pixel value is adjusted for bias). Such weightings can be used to compute the illuminant color value of the scene (e.g., as a weighted Norm), which may then be used to determine gain values adjusting the white levels of the image.

In various embodiments, one or more channel values of the illuminant color value of the pixels can be determined based on the weightings and the color values of the pixels (e.g., as a weighted Minkowski norm). The one or more channels can include (for example and without limitation) a red channel, a green channel, and a blue channel. The red channel value $\mu_R$ may be computed using Equation (8), the green channel value $\mu_G$ may be computed using Equation (9), and the blue channel value $\mu_R$ may be computed using Equation (10), as follow:

$$\mu_R = \frac{\Sigma_n R_n \times W_{SNR}(RGB_n)}{N} \qquad \text{Equation (8)}$$

$$\mu_G = \frac{\Sigma_n G_n \times W_{SNR}(RGB_n)}{N} \qquad \text{Equation (9)}$$

$$\mu_B = \frac{\Sigma_n B_n \times W_{SNR}(RGB_n)}{N} \qquad \text{Equation (10)}$$

In addition, white balance gains may also be computed for one or more channels of the illuminate color value. The red channel gain value Gain$_R$ may be computed using Equation (11), the green channel value Gain$_G$ may be computed using Equation (12), and the blue channel value Gain$_R$ may be computed using Equation (13), as follows:

$$\text{Gain}_R = \frac{\max(\mu_R \mu_G \mu_B)}{\mu_R} \qquad \text{Equation (11)}$$

$$\text{Gain}_G = \frac{\max(\mu_R \mu_G \mu_B)}{\mu_G} \qquad \text{Equation (12)}$$

$$\text{Gain}_B = \frac{\max(\mu_R \mu_G \mu_B)}{\mu_B} \qquad \text{Equation (13)}$$

Once a gain value is determined, the image can be color adjusted by applying the gain value to a corresponding color channel of the image (e.g., applying the one or more color gain values to pixel color values of the image). For instance, a final image can comprise pixel values adjusted by the color gain values to white balance the image. In some embodiments, information used in white balancing an image may be determined and applied via a general-purpose processor device (e.g., a CPU) of an imaging device. Image data representative of the image (e.g., captured by a camera) may undergo white balancing via one or more pipelines of a specialized-processor (e.g., an image signal processor, FPGA, or an ASIC) of the imaging device. In various embodiments, the image data may be separately or collectively processed by a graphical processing unit (GPU), image signal processor (ISP), Central Processing Unit (CPU), and/or a digital signal processor (DSP).

Some of the disclosed embodiments may be deployed in vehicle-mounted imaging devices (e.g., dash-cams). Further, the various embodiments may be deployed in autonomous vehicle applications, or other such machine-vision applications. Gain values determined in accordance with disclosed embodiments can further be applied in a variety of manners related to illumination in images. For instance, the gain values can be used in applications including a color correction matrix, etc.

Systems for Imaging and White Balancing

With reference to FIG. 1, FIG. 1 provides a schematic diagram of an imaging system 100, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a logic device 120, such as but not limited to a general purpose processor 122 and/or an image signal processor (ISP) 124 executing instructions stored in memory.

The imaging system 100 may include, among other things, computing devices that include one or more image sensors (e.g., a camera). Such computing devices may include, but are not limited to, a mobile or stationary camera (e.g., a handheld camera 102, a smartphone, a tablet, or the like), a manned or unmanned terrestrial vehicle (e.g., a vehicle 104), a manned or unmanned aerial vehicle (e.g., a drone 106), or a wearable device (e.g., smart glasses 108). Such computing devices that include one or more image sensors may herein be referred to collectively as the camera computing devices 102-108.

Although some camera computing devices are illustrated in FIG. 1, this is not intended to be limiting. In any example, there may be any number of camera computing devices and/or camera computing devices that are not explicitly shown in FIG. 1. Virtually any computing device that includes one or more image sensors and/or cameras may be included in an imaging system that is in accordance with the various embodiments.

Any of the camera computing devices 102-108 (or other camera computing devices included in the system 100) may include one or more image sensors that are enabled to capture Low Dynamic Range (LDR) image data, Standard Dynamic Range (SDR) image data, and/or High Dynamic Range (HDR) image data, as discussed throughout. The imaging system 100 may include other computing devices, such as but not limited to a server computing device 110 (or a personal computing device). The server computing device 110 may not include an image sensor. However, in other embodiments, the server computing device 110 may include an image sensor (e.g., an auxiliary camera). The terrestrial vehicle 104 and/or the aerial vehicle 106 may be at least partially manually operated vehicles and/or when manned, partially autonomous. In some embodiments, when unmanned, the vehicles 104 and 106 may be autonomous, partially autonomous, and/or remote controlled vehicles. Various embodiments of such vehicles are discussed in conjunction with FIGS. 6A-6D.

Figure 7:
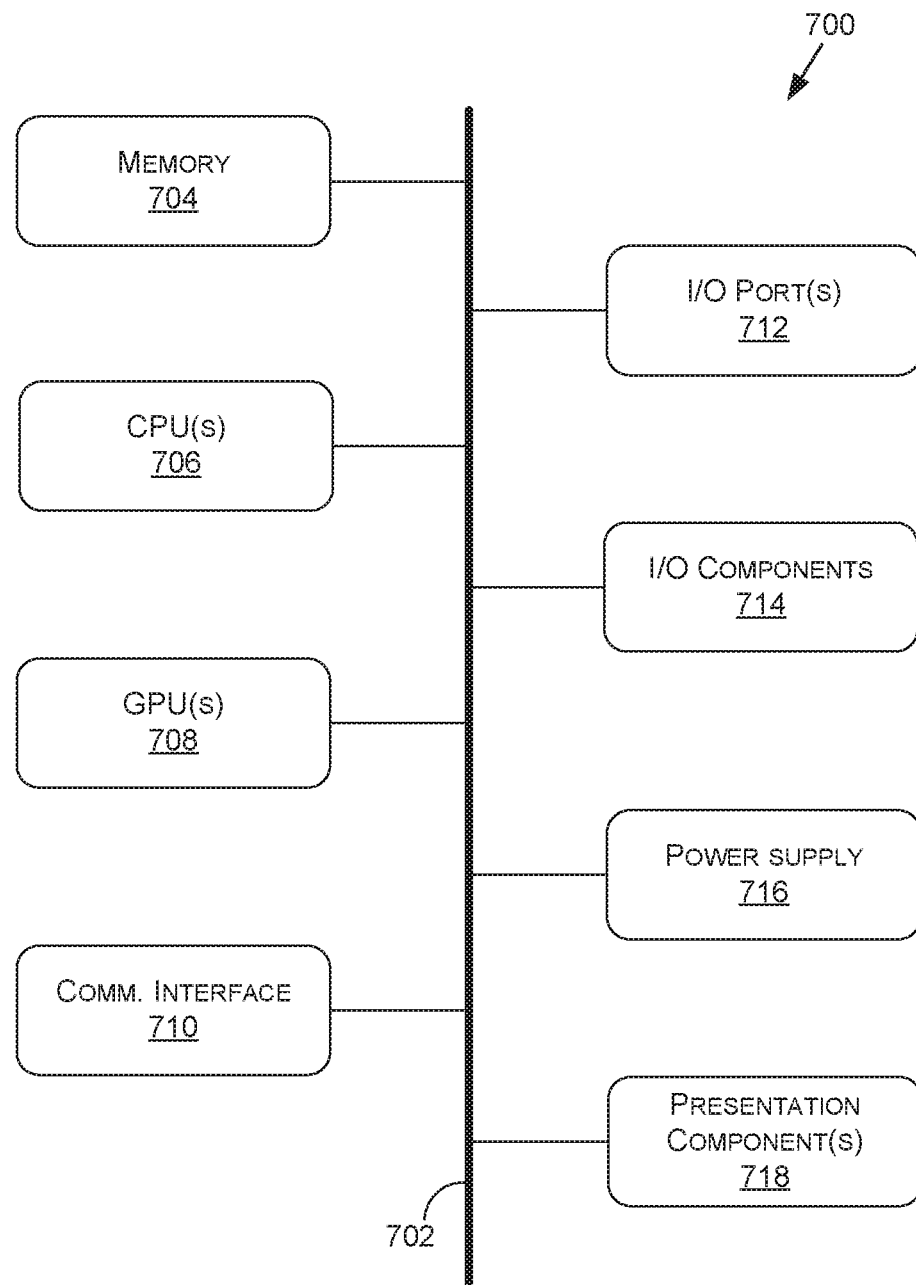
FIG. 7 is a block diagram of an example computing environment suitable for use in implementing some embodiments of the present disclosure.

Various embodiments of computing devices, including but not limited to the computing devices 102-110 are discussed in conjunction with a computing device 700 of FIG. 7. However, briefly here, each one of the computing devices 102-110 may include one or more logic devices. For example, the camera 102 is shown to include the logic devices 120. The logic devices 120 may include one or more of the general purpose processor 122 (e.g., a Central Processing Unit (CPU), a microcontroller, a microprocessor, or the like), the Image Signal Processor (ISP) 124, an Application Specific Integrated Circuit (ASIC) 126, and/or a Field Programmable Gate Array (FPGA) 128. Although not shown in FIG. 1, in some embodiments, the logic devices 120 may include a Graphics Processing Unit (GPU). It should be noted that any of the computing devices 102-110 may include one or more of such logic devices.

Various components of the imaging system 100 (e.g., the computing devices 102-110) may communicate over network(s) 112. The network(s) 112 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the imaging system 100 may communicate with one or more of the other components via one or more of the network(s) 112.

Any of the computing devices 102-110 may implement, operate, or otherwise execute the functions and/or operations of a white balance engine 140. For example, in FIG. 1, the camera 102 is shown implementing the white balance engine 140. However, any of the computing devices 102-110 may be enabled to implement the white balance engine 140. Any of the logic devices 120 may implement at least some of the functions, operations, and/or actions of the white balance engine 140.

The white balance engine 140 may enable various methods of applying white balancing to an image. In particular, the white balance engine 140 may be used to normalize illuminance in images to overcome bias from highly lit pixels in images. To carry out such functionality, the white balance engine 140 may include one or more components, modules, devices, or the like. Such components, modules, and/or devices may include but are not limited to one or more of a weighting determiner 148, an illuminant color determiner 152, a color gain determiner 154, an image data buffer 146, and a white balance applicator 158. Any of these components, modules, and/or devices may be optional in some embodiments.

The enumeration of components, modules, and/or devices of the white balance engine 140, as discussed in conjunction with FIG. 1, is not intended to be exhaustive. In other embodiments, the white balance engine 140 may include fewer or more components, modules, and/or devices. As discussed throughout, the white balance engine 140 may implement and/or carry out at least portions of the processes, actions, and/or operations discussed in conjunction with the methods 300, 400, and 500 of FIGS. 3, 4, and 5, respectively. As such, one or more of the logic devices 120 may implement and/or carry out at least portions of the methods 300, 400, and/or 500.

In embodiments, the white balance engine 140 can receive information from an image sensor(s) 144. The image sensor(s) 144 is enabled to capture image data. Such image data can be raw (e.g., unprocessed) image data or may undergo some amount of processing. Such image data can be LDR image data, SDR image data, and/or HDR image data. For instance, when the image data is HDR image data, the captured HDR image data may encode an image or scene that is imaged by the image sensor(s) 144. As discussed throughout, the image sensor 144, which captures raw image data, may be mounted on a vehicle (e.g., the terrestrial vehicle 104 or the aerial vehicle 106) or other machine, device, or apparatus. The vehicle may be an autonomous, or at least a partially autonomous, vehicle. The vehicle may be controlled (e.g., steered and/or driven), at least partially, based on the image data and/or white balanced image data (e.g., image data 160).

The image sensor(s) 144 may include, be affected by, and/or be subject to one or more sensor limitations. For instance, such sensor limitations may define maximal signal-to-noise ratio (SNR) values. Such maximal SNR values can indicate a maximum value of brightness that can be captured based on the image sensor(s) 144.

According to some embodiments, computing devices in the imaging system 100 that may not include image sensors and/or cameras (e.g., the server computing device 110). In such embodiments, the image sensors included in any of the camera computing devices 102-108 may employed to capture the image data. The image data may be provided, via the networks 112, to a white balance engine 140 that is implemented—at least partially—at and/or by the server computing device 110. That is, although the image data may be captured by at least one of the camera devices 102-108, the white balancing may be performed offline on the server computing device 110 and/or at another device. To state in another fashion, the white balancing of the image data may be offloaded to a computing device that did not capture the image data. Because the camera computing devices 102-108 may include one or more manned or unmanned vehicles (e.g., the terrestrial vehicle 104 and aerial vehicle 106), the image data may be captured by a camera included in or mounted on a vehicle. As noted above, the vehicle may be an autonomous, or at least partially autonomous, vehicle. The various embodiments may enable, or at least assist in the enablement, of various machine and/or computer vision features of an autonomous vehicle, such as but not limited to the terrestrial vehicle 104 or the aerial vehicle 106. Embodiments may be deployed to enable the machine and/or computer vision features of other applications, such as but not limited to robotics applications.

As shown in FIG. 1, the white balance engine 140 includes a pipeline for processing the image data to determine information related to white balancing an image, as indicated by the arrows. More specifically, the white balance engine 140 includes an image data pipeline 162. The image data pipeline 162 is generally responsible for determining and/or generating the information that may be used in white balancing an image (e.g., white balance gains for one or more color channels of an image). The image data pipeline 162 (via either the weighting determiner 148, the illuminant color determiner 152, and/or the color gain determiner 154) provides information (e.g., gain values) that may be used in white balancing to the white balance applicator 158. The white balance applicator 158 is generally responsible for applying the information that may be used in white balancing to the image data (e.g., captured using the image sensor(s) 144) to generate the image data 160. As discussed below, the image sensor(s) 144 captures image data, and provides the image data to the image data pipeline 162 (directly or indirectly and potentially after some pre-processing). In the non-limiting embodiment of FIG. 1, and as shown via the pipeline flow arrows, the image data may be provided to the image data pipeline 162 via the image sensor(s) 144. This image data can be used in determining information for white balancing. Such image data may be provided to the image data buffer 146 such that the image data can be combined with the information for white balancing via the white balance applicator 158.

As shown in FIG. 1, the white balance engine 140 outputs the image data 160. The image data 160 may correspond to the image captured by the image sensor 144. However, rather than the pixel values of the image data captured by the image sensor(s) 144, the pixel values of the image data 160 may be defined by applying (via the white balance applicator 158) white balancing (determined via the image data pipeline 162) to the image data. That is, the pixel values of the image data 160 may be representative of a white balanced version of the pixel values of the image data. In some embodiments, the input image data and/or outputted image data 160 may be either Standard Dynamic Range (SDR) image data or LDR image data. However, in other embodiments, the input image data and/or the image data 160 may be HDR image data.

As shown in FIG. 1, at least a portion of the image data may be provided and/or received by an image data buffer 146. The image data buffer 146 may buffer, or at least temporarily store, the image data. As discussed in more detail below, the image data pipeline 162 determines information for white balancing an image and provides such information to the white balance applicator 158. More specifically, as shown in FIG. 1, the weighting determiner 148 may determine weightings of pixels for the image data, and then provide these weightings to the illuminant color determiner 152. The illuminant color determiner 152 may determine one or more channel values of an illuminant color value of the pixels based on the weightings and the color values of the pixels, and then provide the one or more channel values to the color gain determiner 154. The color gain determiner 154 may determine one or more color gain values based on the one or more channel values of the illuminant color value.

In embodiments, a weighting determiner 148 may receive the image data (e.g., from the image sensor(s) 144). From the image data, the weighting determiner 148 may be used to determine weights used to determine an illuminate color value of the image represented by the image data. Such weights may be computed using Equation (6) and/or Equation (4). For example, the weights may be used to reduce bias in one or more channels towards highlight values (e.g., as pixels) in images (e.g., HDR images) when determining an illuminant color value. Weighting can be applied in any manner that limits the impact of outlier pixels (e.g., pixels with highlight values) rather than merely excluding such outliers. For example, in some embodiments, a standard deviation can be used to identify pixels that should be weighted to reduce bias. In other embodiments, weighting can also or alternatively be based at least in part on the actual Signal-to-Noise Ratio (SNR) of pixels. SNR weighting (e.g., SNR adjustment) may reduce the effect of pixels with high noise. For instance, SNR can be used to rescale super bright RGBs (e.g., pixels with highlight values). This rescaling can adjust pixels with highlight values to a lower light value. In embodiments, this lower light value can be formatted to the same level as a corresponding LDR image.

The image data may capture information related to actual SNR of pixels (e.g., brightness values). The actual value of the SNR can be determined based on data provided by the camera computing devices 102-108. For instance, such actual SNR of pixels can be determined based on information associated with the image sensor(s) 144. In various embodiments, the weighting determiner 148 may use the information related to actual SNR and/or actual SNR values to compute the weightings for pixels. For example, the weighting determiner 148 may compute the weightings using Equation (6), which accounts for the estimated SNR values defined by Equation (5) and optionally any other of the various equations upon which Equation (6) may be based (e.g., to compute values of variables). When using actual SNR values to compute the weights, Equation (6) may be modified to account for the actual SNR values in place of the estimated SNR values, but may similarly rescale pixels based on the SNR values and/or brightness values.

In HDR images generated using multiple (e.g., two or more) captured LDR images/exposures of the same scene, the SNR can rise relative to brightness of a pixel and then dip for pixels where the short exposure from an LDR or SDR image starts to contribute. For instance, in a dual exposure HDR image, the SNR can rise relative to the brightness of a pixel and then suddenly dip for pixels where the short exposure starts to contribute. This dip occurs in the same manner during the short exposure(s) in additional (e.g., triple) exposure HDR images. Such a relationship is illustrated, by way of example, in FIG. 2A.

Referring to FIG. 2A, FIG. 2A shows examples of the actual SNR values (e.g., the y-axis) plotted against the pixel brightness values (e.g., the x-axis) of the image represented by the image data. For instance, FIG. 2A shows the actual SNR values for a two-exposure SNR 202 and a multi-exposure SNR 204. In a non-limiting embodiment of FIG. 2A, a maximal actual SNR value 214 (e.g., $\max_{snr}$) at point 206 may be based on information associated with an image sensor of a camera device capturing the two-exposure SNR 202 (e.g., the image sensor(s) 144 of FIG. 1). An SNR value at a point 208 can be the dip for pixels where the short exposure of the second exposure of the two-exposure SNR 202 starts to contribute. In another non-limiting embodiment of FIG. 2A, the maximal actual SNR value 214 may be reached at various points, such as the point 212, and may be based on information associated with an image sensor of a camera device capturing the multi-exposure SNR 204 (e.g., the image sensor(s) 144 of FIG. 1). An SNR value at a point 210 can be one of the dips for pixels where the short exposure of an additional exposure of the multi-exposure SNR 204 starts to contribute.

Figure 2B:
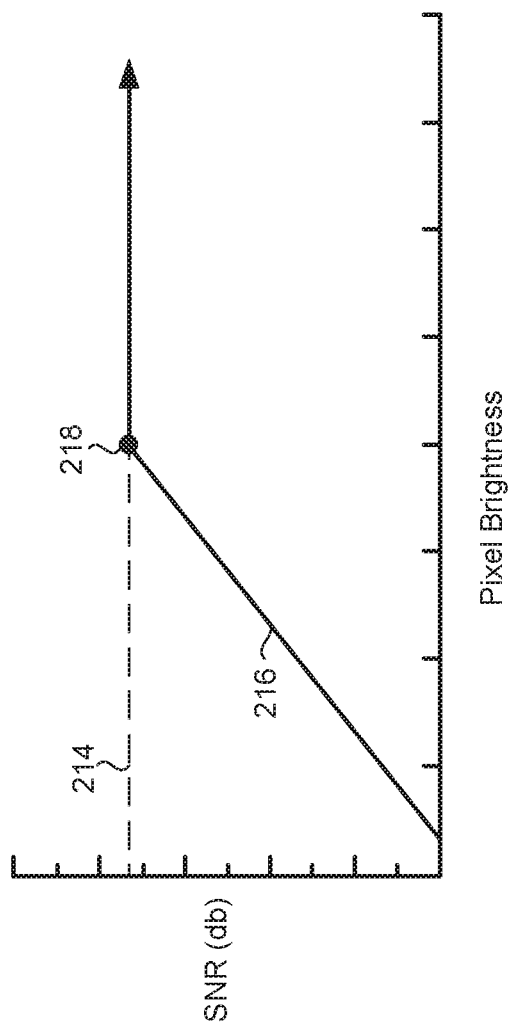
FIG. 2B shows example estimated SNR values corresponding to pixel brightness values of raw image data, in accordance with some embodiments of the present disclosure.

Referring to FIG. 2B, FIG. 2B shows examples of the estimated SNR values (e.g., the y-axis) plotted against the pixel brightness values (e.g., the x-axis) of the image represented by the image data, in accordance with various embodiments. For instance, FIG. 2B shows estimated SNR 216, which may be for one or more of the two-exposure SNR 202 or the multi-exposure SNR 204 of FIG. 2A. In the non-limiting embodiment of FIG. 2B, the estimated SNR value at a point 218 (which may be the point 206 of FIG. 2A where an initial exposure ends) may be based on information associated with an image sensor of a camera device capturing the two-exposure SNR 202 and/or the multi-exposure SNR 204 (e.g., image sensor(s) 144 of FIG. 1). For example, the estimated SNR value at the point 218 may be based on the maximal actual SNR value 214, as shown.

Equation (5) may capture the estimated SNR 216 of FIG. 2B, and Equation (6) may be based on Equation (5). In other examples, Equations (5) and/or (6) may be modified to more accurately capture the relationships between pixel brightness and actual SNR, such as those defined by the two-exposure SNR 202 and/or the multi-exposure SNR 204, or to capture those relationships in a different manner. Implementing Equations (5) and (6) may result in a computationally efficient determination of the estimated SNR values. Further, Equations (5) and (6) may be used for both the two-exposure SNR 202 and the multi-exposure SNR 204. However, in other examples, different equation(s) may be used for the two-exposure SNR 202 and the multi-exposure SNR 204.

Thus, as described herein, in some embodiments, the weighting determiner 148 may be used to determine weights of pixels based on estimated SNR values. The weighting determiner 148 may determine the weightings based on the estimated SNR, for example, by computing brightness values using Equation (7), then applying the brightness values to Equation (6) to compute the weightings. In other embodiments, the weighting determiner 148 may determine the weightings in any manner that will reduce bias from particular pixels in the system. For example, a standard deviation may be used to identify pixels that should be weighted to reduce bias. Weighting can be applied in any manner that limits the impact of outlier pixels (e.g., pixels with highlight values) rather than merely excluding such outliers. For example, the weightings may be computed, at least partially, in accordance with Equation (4). Additionally, the weighting determiner 148 may in some embodiments compute the estimated SNR values, for example, using Equation (5), and/or compute the weightings using the estimated SNR values and/or actual SNR values.

The illuminant color determiner 152 may determine one or more channel values of an illuminant color value of the pixels based on the weightings and the color values of the pixels. Such weightings can be those determined using the weighting determiner 148. In embodiments, the illuminant color determiner 152 may apply weightings to pixels that are determined to have light values (e.g., brightness) above a predefined threshold. For instance, the predefined threshold can be based on the capabilities of a camera device that is capturing images (e.g., a photo sensor of the camera device). Such a predefined threshold can be based on the maximal image capturing capabilities of the image sensor(s) 144 of the camera 102 (e.g., 12 bits) and may be or correspond to the maximal actual SNR value 214 of FIG. 2A. This may in some cases be embodied by Equation (6) or may be evaluated, at least partially, by the illuminant color determiner 152. When the brightness of a pixel is below the threshold value, the weight of the SNR can be 1 (e.g., such that the pixel value is fully weighted in determining the norm of the image). When the brightness of a pixel is above the threshold value, the weight of the SNR can be the maximal SNR value divided by the brightness of the pixel (e.g., such that the pixel value is partially weighted in determining the norm of the image).

The illuminant color determiner 152 may, for example, compute the illuminant color value of the image and/or scene using one or more of Equations (8), (9), or (10) to determine a color channel value of a corresponding color channels of the illuminant color value. While the Equations described herein are described in terms of RGB, they may be modified to account for different color formats.

The color gain determiner 154 may determine one or more color gain values based on the one or more channel values of the illuminant color value computed by the illuminant color determiner 152. For example, the color gain determiner 154 may compute one or more color gain values using one or more of Equations (11), (12), or (13) to determine a gain value for a corresponding color channels of the image. Each gain value may represent how much pixel color values for a corresponding color channel of the image should be adjusted to white balance the image.

The white balance applicator 158 may receive the image data and one or more color gain values (e.g., information for white balancing) determined by the color gain determiner 154. The white balance applicator 158 may apply the color gain values to the image data to generate the image data 160. That is, the white balance applicator 158 may transform the image data to generate the image data 160. The white balance applicator 158 may, in some examples, employ the ISP 124 to apply the information for white balancing to the image data. In some embodiments, a pipeline of the ISP 124 may be employed to apply the information for white balancing to the image data. As noted above, the information for white balancing may reduce bias from certain pixels and increase accuracy when white balancing the image data to generate the image data 160.

Figure 3:
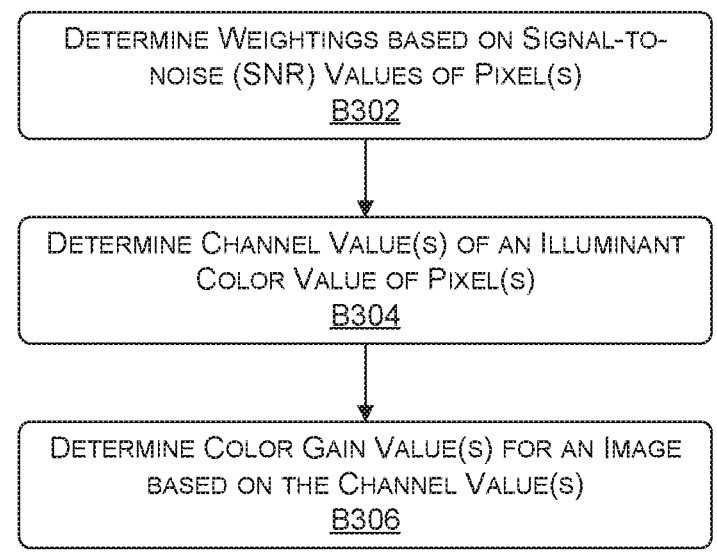
FIG. 3 is a flow diagram showing an example method for white balancing using weightings based on SNR values, in accordance with some embodiments of the present disclosure.
Figure 4:
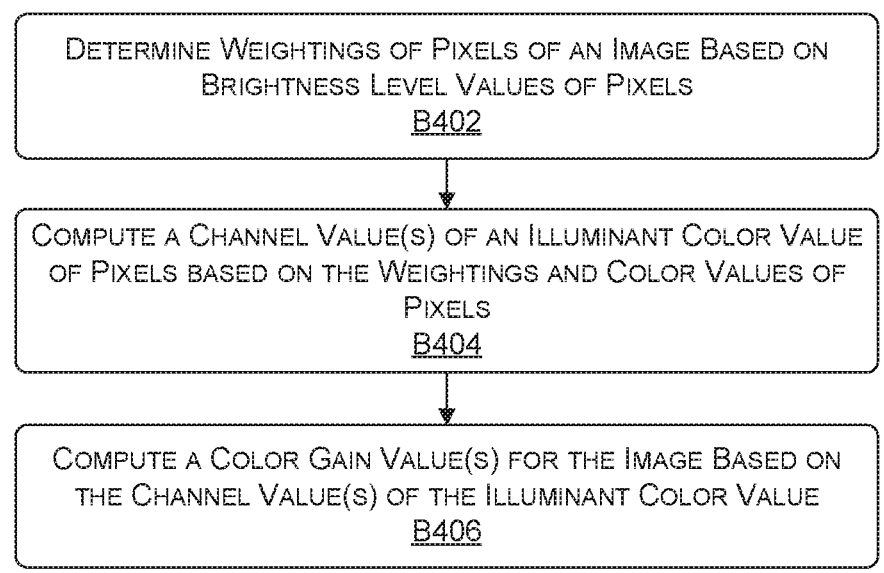
FIG. 4 is a flow diagram showing an example method for white balancing using weightings based on brightness values of pixels, in accordance with some embodiments of the present disclosure.
Figure 5:
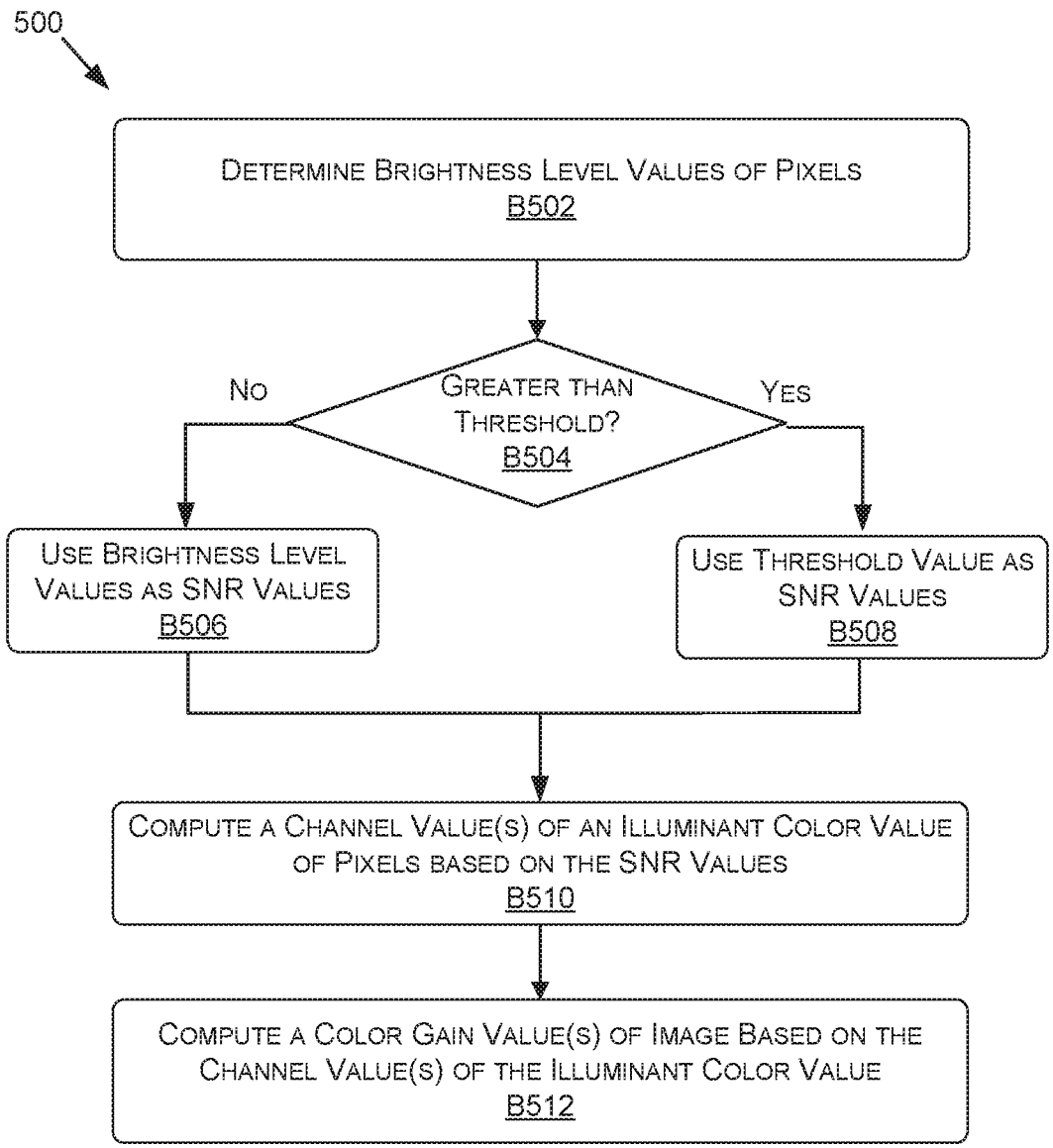
FIG. 5 is a flow diagram showing an example method for determining white balancing information, in accordance with some embodiments of the present disclosure.

Now referring to FIGS. 3-5, each block of the methods 300, 400, and 500 described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 300, 400 and 500 are described, by way of example, with respect to the imaging system 100 of FIG. 1. For example, at least a portion of the methods 300, 400, and 500 may be carried out by the white balance engine 140 and/or one or more of the logic devices 120. However, these methods may additionally or alternatively be executed by any one system, or any combination of systems, including, but not limited to, those described herein.

FIG. 3 is a flow diagram showing the method 300 for white balancing using weightings based on SNR values, in accordance with some embodiments of the present disclosure. At block B302, the method 300 includes determining weightings based on SNR values of pixel(s). The SNR values can be actual or estimated SNR values. In embodiments using actual SNR values, the SNR values can be determined based on one or more image sensors used to capture raw image data (e.g., the image sensors 144 of FIG. 1). In some embodiments that use estimated SNR values, the SNR values can be determined using the weighting determiner 148 of FIG. 1 and/or incorporated into the computation of the weightings, such as using Equation (6).

At block B304, one or more channel values of an illuminant color value of pixel(s) may be determined. For example, the illuminant color determiner 152 of FIG. 1 may determine and/or generate an illuminant color value of pixel(s) using the weightings. For instance, the illuminant color determiner 152 may determine one or more channel values of an illuminant color value of the pixels based on the weightings and the color values of the pixels. The one or more channels can include (for example and without limitation) a red channel, a green channel, and a blue channel.

At block B306, a color gain value(s) for an image can be determined based on the channel value(s) of the illuminant color value. For example, the color gain determiner 154 of the white balance engine 140 may determine color gain value(s) of an image. These gains can be one or more color gain white balancing values for the image based on the one or more channel values of the illuminant color value.

White balanced image data may be generated based on applying the white balancing information (e.g., color gain value(s)) to image data. For example, the white balance applicator 158 may apply the white balancing information to the image data. The white balanced image data may encode an image, where the pixel values are defined by the white balancing information being applied to corresponding pixel values of the image data.

FIG. 4 is a flow diagram showing the method 400 for white balancing using weightings based on brightness values of pixels, in accordance with some embodiments of the present disclosure. In some embodiments, prior to block B402 of the method 400, image data may be received at and/or provided to a white balance engine, such as but not limited to the white balance engine 140 of FIG. 1. In at least one embodiment, the image data may be provided to and/or received by at least one of: the weighting determiner 138, the illuminant color determiner 152, and/or the color gain determiner 154 of the white balance engine 140. Such image data may be HDR image data. The image data may be captured by at least one image sensor (e.g., of a camera device) that is mounted on a manned or unmanned terrestrial or aerial vehicle (e.g., the terrestrial vehicle 104 and/or aerial vehicle 106 of FIG. 1).

The method 400, at block B402, includes determining weightings based on brightness level values of pixels. For example, the weighting determiner 148 may determine and/or compute the brightness level values using Equation (7). The brightness level values may then be used by the weighting determiner 148 to compute the weightings.

At block B404, one or more channel values of an illuminant color value of the pixels may be computed based on the weightings and color values of the pixels. For example, the illuminant color determiner 152 of FIG. 1 may determine and/or generate an illuminant color value of pixel(s). For instance, illuminant color determiner 152 may determine one or more channel values of the illuminant color value of the pixels based on the weightings and the color values of the pixels. The one or more channels can include (for example and without limitation) a red channel, a green channel, and a blue channel.

At block B406, a color gain value(s) for the image can be computed based on the channel value(s) of the illuminant color value. For example, the color gain determiner 154 of the white balance engine 140 may determine the color gain value(s) for an image. These gain values can include be one or more white balancing color gain values.

In some embodiments, the color gain value(s) may be applied to generate image data. In various embodiments, the white balance applicator 158 of FIG. 1 may be employed to transform the image data into white balanced image data, using the white balance information, as described herein.

FIG. 5 is a flow diagram showing the method 500 for determining white balancing information, in accordance with some embodiments of the present disclosure. At block B502, brightness level values of pixels may be determined. In embodiments, the weighting determiner 148 may be used to determine the brightness level values of pixels.

At block B504, determinations can be made for particular pixels as to whether the brightness level value of the pixel is greater than a threshold. This threshold may be a predefined threshold based on the capabilities of a camera device that is capturing images (e.g., the image sensor(s) 144 of the camera 102). For instance, the threshold can be based on the maximal SNR capturing capabilities of the image sensor(s) 144 of the camera 102 (e.g., 12 bits). In some embodiments, the weighting determiner 148 makes this determination related to the brightness level values, such as by using Equation (6). When a determination is made at B504 that a brightness level value is not greater than the threshold, the method 500 can proceed to block B506. When a determination is made at block B504 that a brightness level value is greater than the threshold, the method 500 can proceed to block B508.

At block B506, brightness level values are used as SNR values for corresponding pixels in computing the weightings of the pixels. For instance, when a brightness level value is below the threshold value, the weighting determiner 148 may use the brightness level value of the pixel as the SNR value of the pixel in computing a weighting for the pixel. At block B508, the threshold value may be used as SNR values for corresponding pixels when computing the weightings of the pixels. For instance, the threshold value can be the maximal SNR value (e.g., based on the maximal SNR capturing capabilities of the image sensor(s) 144 of the camera 102.

At block B510, a channel value(s) of an illuminant color value of pixel(s) may be determined. For example, the illuminant color determiner 152 of FIG. 1 may determine and/or generate an illuminant color value of pixel(s). For instance, the illuminant color determiner 152 may determine one or more channel values of an illuminant color value of the pixels based on the weightings and the color values of the pixels.

At block B512, a color gain value(s) for an image can be determined based on the channel value(s). For example, the color gain determiner 154 of the white balance engine 140 may determine the color gain value(s) of an image using one or more channel values of the illuminant color value.

Example Embodiments of an Autonomous Vehicle

Figure 6A:
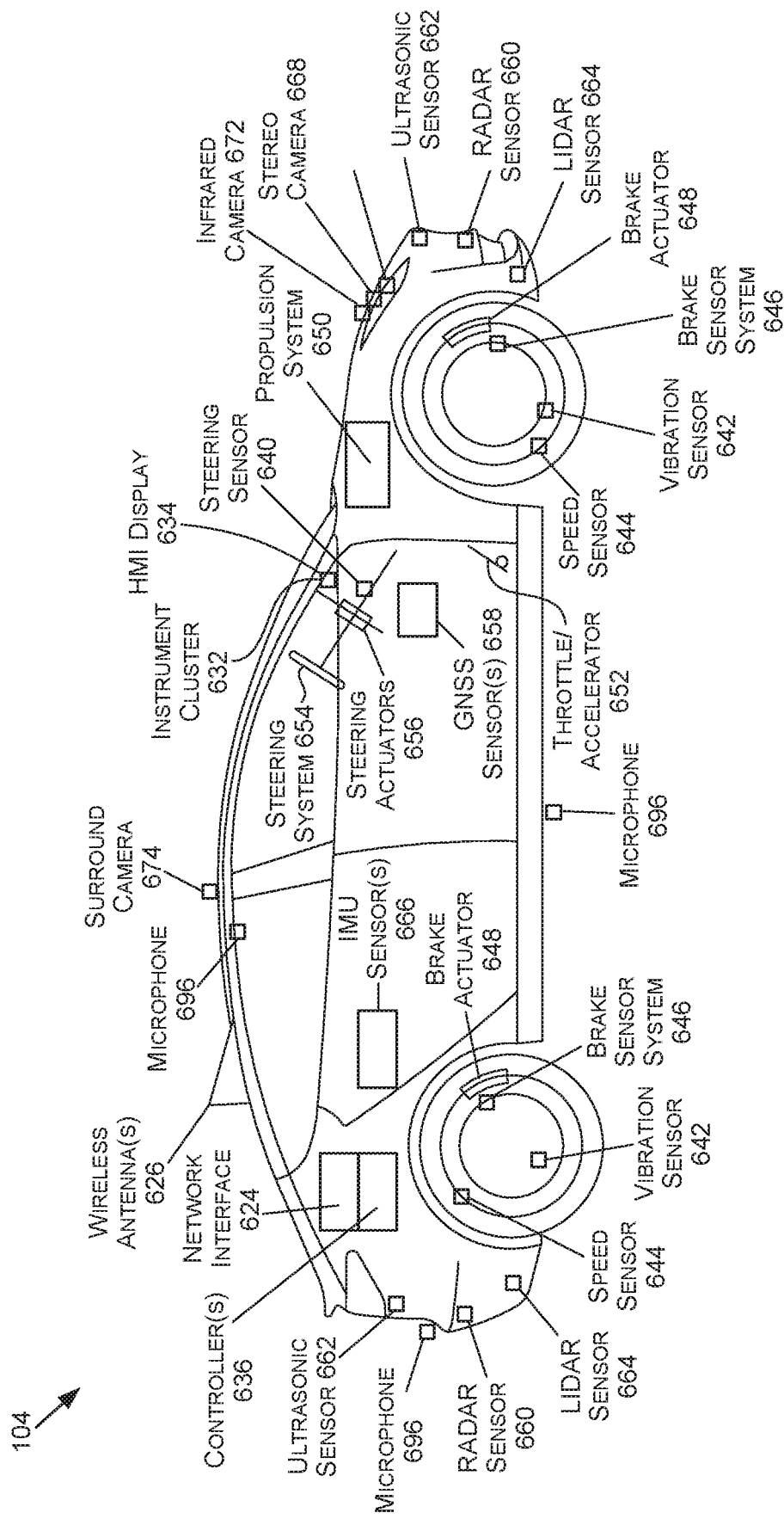
FIG. 6A is an illustration of an example autonomous vehicle, in accordance with some embodiments of the present disclosure.

FIG. 6A is an illustration of an example autonomous vehicle 104, in accordance with some embodiments of the present disclosure. The autonomous vehicle 104 (alternatively referred to herein as the "vehicle 104") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 104 may be capable of functionality in accordance with one or more of Level 3-Level 5 of the autonomous driving levels. For example, the vehicle 104 may be capable of conditional automation (Level 3), high automation (Level 4), and/or full automation (Level 5), depending on the embodiment.

The vehicle 104 may include components such as a chassis, a vehicle body, wheels (e.g., 2, 4, 6, 8, 18, etc.), tires, axles, and other components of a vehicle. The vehicle 104 may include a propulsion system 650, such as an internal combustion engine, hybrid electric power plant, an all-electric engine, and/or another propulsion system type. The propulsion system 650 may be connected to a drive train of the vehicle 104, which may include a transmission, to enable the propulsion of the vehicle 104. The propulsion system 650 may be controlled in response to receiving signals from the throttle/accelerator 652.

A steering system 654, which may include a steering wheel, may be used to steer the vehicle 104 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 104. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 104. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 104 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope (s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 104), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 104 and provide outputs (e.g., represented by output data, display data, etc.) via a human-machine interface (HMI) display 634, an audible annunciator, a loudspeaker, and/or via other components of the vehicle 104. The outputs may include information such as vehicle velocity, speed, time, map data (e.g., the HD map 622 of FIG. 6C), location data (e.g., the vehicle's 104 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 104 further includes a network interface 624 which may use one or more wireless antenna(s) 626 and/or modem(s) to communicate over one or more networks. For example, the network interface 624 may be capable of communication over LTE, WCDMA, UMTS, GSM, CDMA2000, etc. The wireless antenna(s) 626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 6B:
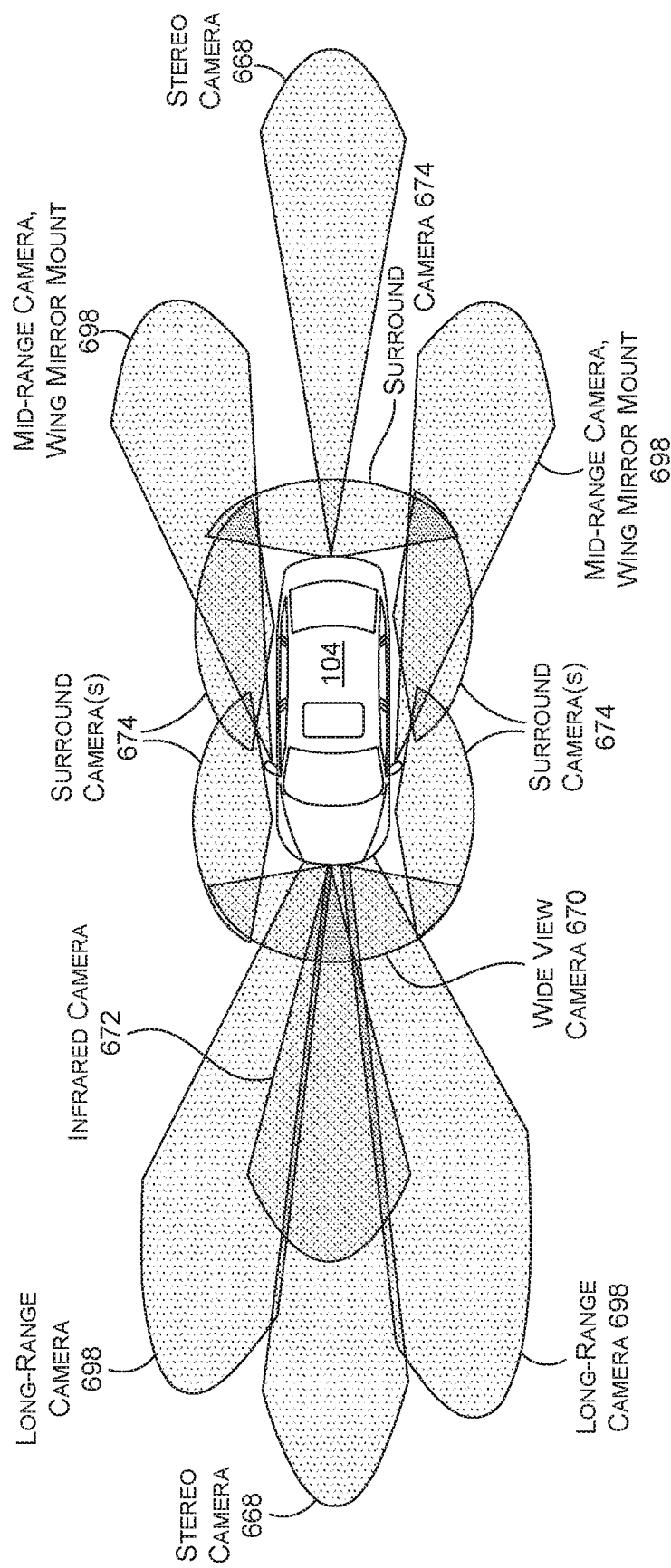
FIG. 6B is an example of camera locations and fields of view for the example autonomous vehicle of FIG. 6A, in accordance with some embodiments of the present disclosure.

FIG. 6B is an example of camera locations and fields of view for the example autonomous vehicle 104 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 104.

The camera types for the cameras may include, but are not limited to, digital cameras that may be adapted for use with the components and/or systems of the vehicle 104. The camera(s) may operate at automotive safety integrity level (ASIL) B and/or at another ASIL. The camera types may be capable of any image capture rate, such as 60 frames per second (fps), 620 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 104 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may any number of wide-view cameras 670 on the vehicle 104. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 104 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 104. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 104 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

Figure 6C:
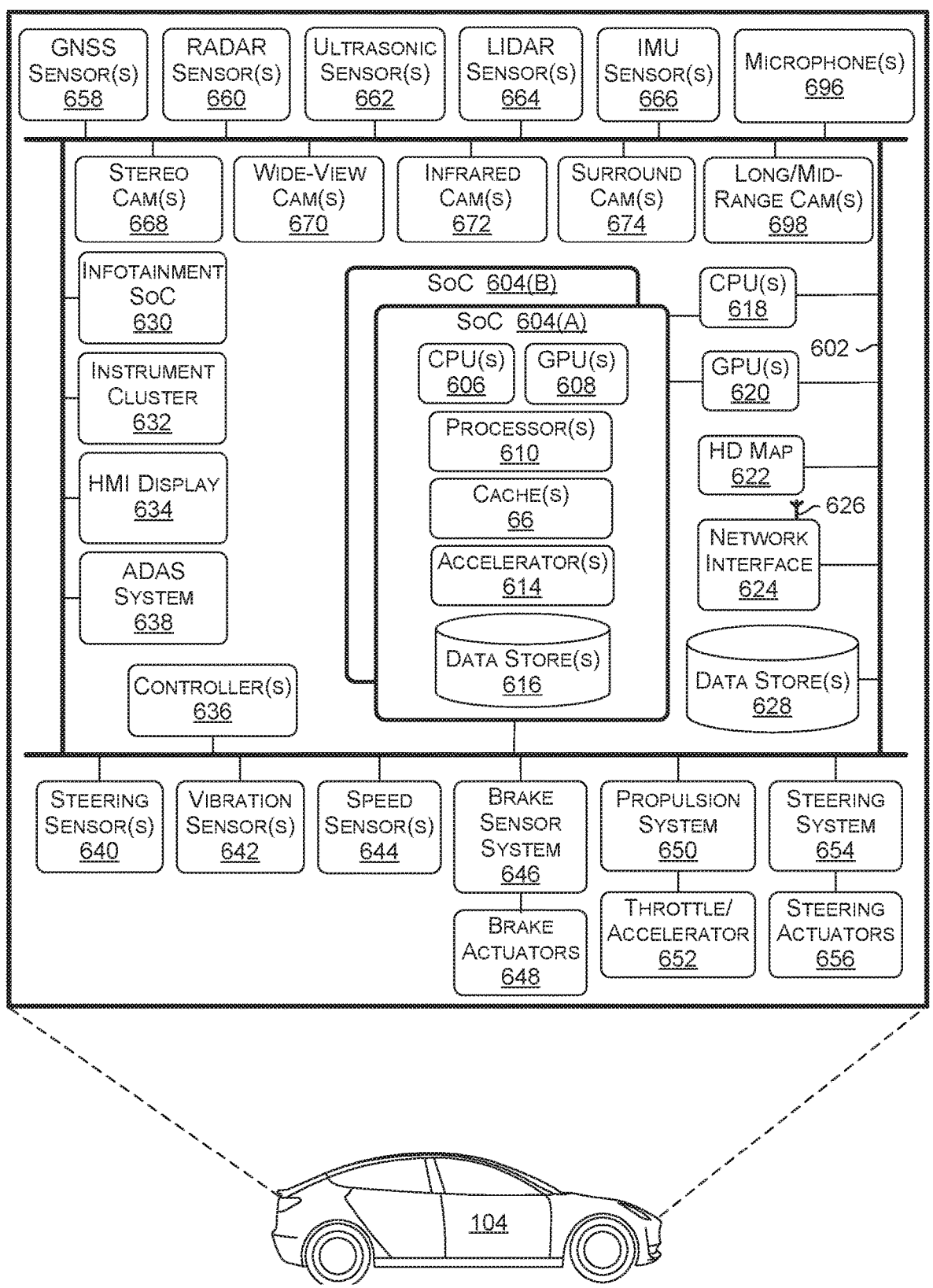
FIG. 6C is a block diagram of an example system architecture for the example autonomous vehicle of FIG. 6A, in accordance with some embodiments of the present disclosure

FIG. 6C is a block diagram of an example system architecture for the example autonomous vehicle 104 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 104 in FIG. 6C are illustrated as being connected via bus 602. The bus 602 may include a Controller Area Network (CAN) data interface (alternatively referred to herein as a "CAN bus"). A CAN may be a network inside the vehicle 104 used to aid in control of various features and functionality of the vehicle 104, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 104, and two or more busses 602 may communicate with the same components. In some examples, each SoC 604, each controller 636, and/or each computer within the vehicle may have access to the same input data (e.g., inputs from sensors of the vehicle 104), and may be connected to a common bus, such the CAN bus.

The vehicle 104 may include one or more controller(s) 636, such as those described herein with respect to FIG. 6A. The controller(s) 636 may be used for a variety of functions. The controller(s) 636 may be coupled to any of the various other components and systems of the vehicle 104, and may be used for control of the vehicle 104, artificial intelligence of the vehicle 104, infotainment for the vehicle 104, and/or the like.

The vehicle 104 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 104 in a variety of platforms and systems. For example, the SoC(s) 604 may be combined in a system (e.g., the system of the vehicle 104) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 104 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 104 into a chauffeur to safe stop mode (e.g., bring the vehicle 104 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 104, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 104. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 104 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 104.

The vehicle 104 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 104 information about vehicles in proximity to the vehicle 104 (e.g., vehicles in front of, on the side of, and/or behind the vehicle 104). This functionality may be part of a cooperative adaptive cruise control functionality of the vehicle 104.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 104 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 104 may further include GNSS sensor(s) 658. The GNSS sensor(s) 658 (e.g., GPS and/or assisted GPS sensors), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 104 may further include RADAR sensor(s) 660. The RADAR sensor(s) 660 may be used by the vehicle 104 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 104 surroundings at higher speeds with minimal interference from traffic in adjacent lanes. The other two antennae may expand the field of view, making it possible to quickly detect vehicles entering or leaving the vehicle's 104 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 104 may further include ultrasonic sensor(s) 662. The ultrasonic sensor(s) 662, which may be positioned at the front, back, and/or the sides of the vehicle 104, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 104 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 104 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 104 m, with an accuracy of 2 cm-3 cm, and with support for a 104 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 104. The LIDAR sensor(s) 664, in such examples, may provide up to a 620-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 104. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 104, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 104 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 104. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 104. The types of cameras used depends on the embodiments and requirements for the vehicle 104, and any combination of camera types may be used to provide the necessary coverage around the vehicle 104. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 104 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 104 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 104 and automatically adjust the vehicle speed to maintain a safe distance from vehicles ahead. Lateral ACC performs distance keeping, and advises the vehicle 104 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 104), while the I2V communication concept provides information about traffic further ahead. CACC systems may include either or both I2V and V2V information sources. Given the information of the vehicles ahead of the vehicle 104, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 104 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 104 if the vehicle 104 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 104 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 104, the vehicle 104 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 104 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 104. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 104. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 104) fail. In such an example, the infotainment SoC 630 may put the vehicle 104 into a chauffeur to safe stop mode, as described herein.

The vehicle 104 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
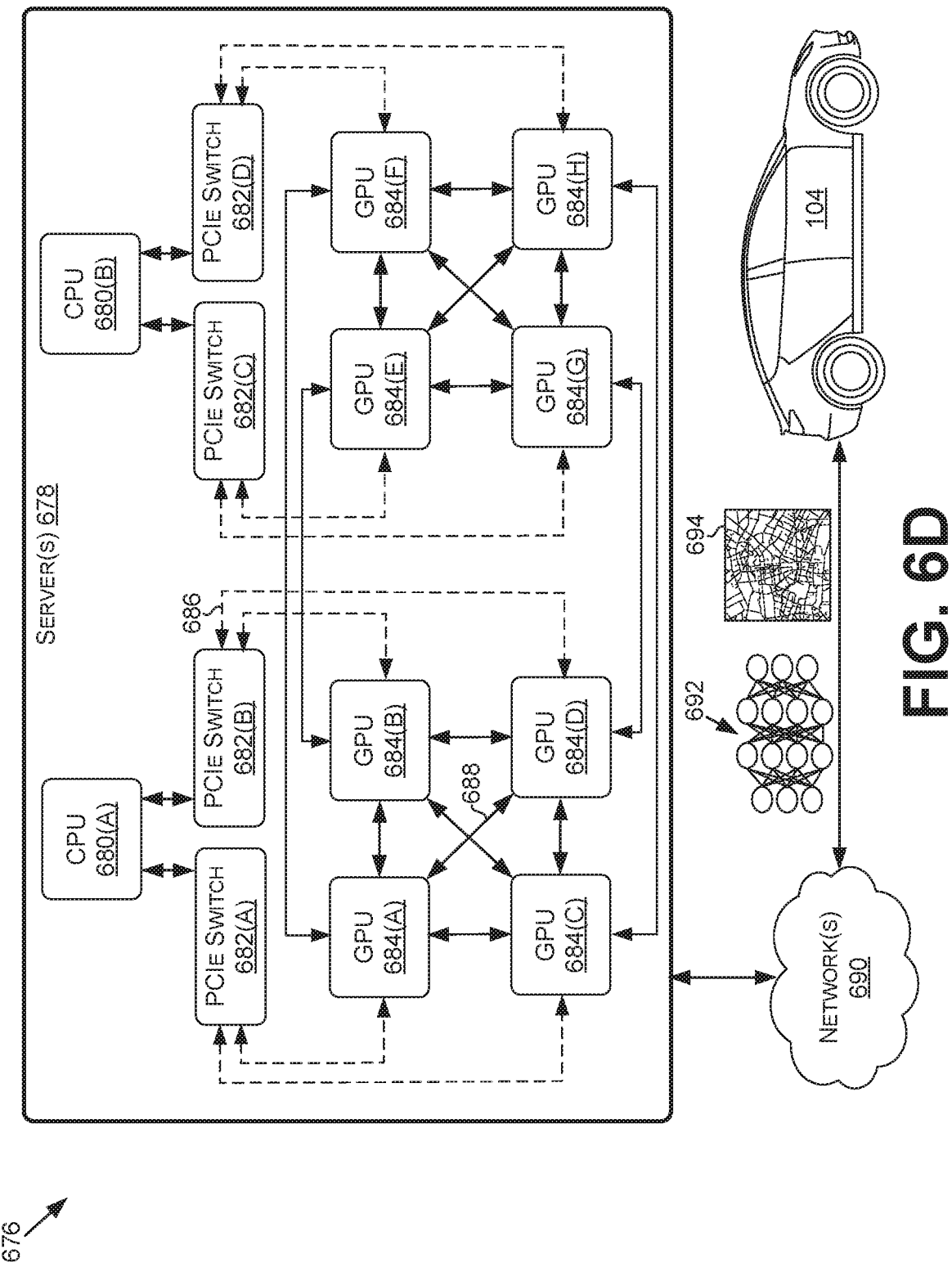
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 104 of FIG. 6A, in accordance with some embodiments of the present disclosure. The system 676 may include server(s) 678, network(s) 690, and vehicles, including the vehicle 104. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 104. For example, the deep-learning infrastructure may receive periodic updates from the vehicle 104, such as a sequence of images and/or objects that the vehicle 104 has located in that sequence of images (e.g., via computer vision and/or other machine learning object classification techniques). The deep-learning infrastructure may run its own neural network to identify the objects and compare them with the objects identified by the vehicle 104 and, if the results do not match and the infrastructure concludes that the AI in the vehicle 104 is malfunctioning, the server(s) 678 may transmit a signal to the vehicle 104 instructing a fail-safe computer of the vehicle 104 to assume control, notify the passengers, and complete a safe parking maneuver.

For inferencing, the server(s) 678 may include the GPU(s) 684 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Generalized Computing Device

FIG. 7 is a block diagram of an example of the computing device 700 suitable for use in implementing some embodiments of the present disclosure. The computing device 700 may include a bus 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)). In addition to CPU 706 and GPU 708, computing device 700 may include additional logic devices that are not shown in FIG. 7, such as but not limited to an image signal processor (ISP), a digital signal processor (DSP), an ASIC, an FPGA, or the like.

Although the various blocks of FIG. 7 are shown as connected via the bus 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The bus 702 may represent one or more busses, such as an address bus, a data bus, a control bus, or a combination thereof. The bus 702 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 704 may include any of a variety of computer-readable media. The computer-readable media may be any available media that can be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of the computing device 700 implemented (e.g., processors with fewer cores for mobile devices and processors with more cores for servers). For example, depending on the type of the computing device 700, the processor may be an ARM processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data. The display memory may be included as part of the memory 704. The GPU(s) 708 may include two or more GPUs operating in parallel (e.g., via a link). When combined together, each GPU 708 can generate pixel data for different portions of an output image or for different output images (e.g., a first GPU for a first image and a second GPU for a second image). Each GPU can include its own memory, or can share memory with other GPUs.

In examples where the computing device 700 does not include the GPU(s) 708, the CPU(s) 706 may be used to render graphics.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
computing weightings for one or more pixels of a first image using signal-to-noise ratio (SNR) values of the one or more pixels;
computing one or more channel values of a color from at least one illuminant of the first image for at least the one or more pixels based at least on the weightings and color values of the one or more pixels;
computing one or more color gain values for the first image based at least on the one or more channel values; and
generating image data representative of a second image using the one or more color gain values.

2. The method of claim 1, wherein the SNR values of the one or more pixels are determined by brightness level values of the one or more pixels.

3. The method of claim 1, wherein computing the weightings comprises:
determining first brightness level values of a first set of pixels of the one or more pixels are greater than a threshold value; and
based on the first brightness level values being greater than the threshold value, using the threshold value as the SNR values for the first set of pixels in computing a set of the weightings for the first set of pixels.

4. The method of claim 1, wherein at least some of the weightings correspond to ratios between a threshold SNR value and brightness levels of the one or more pixels.

5. The method of claim 1, wherein computing the weightings comprises:
assigning partial weightings to a first set of pixels of the one or more pixels based at least in part on first SNR values of the first set of pixels being greater than a threshold SNR value; and
assigning full weightings to a second set of pixels of the one or more pixels based at least in part on second SNR values of the second set of pixels being less than the threshold SNR value.

6. The method of claim 1, wherein the one or more channel values are computed using a Minkowski norm adjusted by the weightings.

7. The method of claim 1, wherein the weightings are further based on chromaticity of the pixels.

8. The method of claim 1, further comprising:
applying the one or more color gain values to the first image to generate adjusted color values of the first image, wherein the generating of the image data representative of the second image uses the adjusted color values.

9. The method of claim 1, wherein the one or more channel values include each channel of a Red Green Blue (RGB) image.

10. The method of claim 1, wherein the SNR values correspond to SNR measurements provided by a camera device that captured image data representative of the first image.

11. A method comprising:
determining weightings of one or more pixels of a first image using brightness level values of the one or more pixels;
computing one or more channel values of a color from at least one illuminant of the first image for at least the one or more pixels based at least on the weightings and color values of the one or more pixels;
computing one or more color gain values of the first image based at least on the one or more channel values; and
generating image data representative of a second image using the one or more color gain values.

12. The method of claim 11, wherein at least one of the weightings corresponds to a ratio between a threshold value and the brightness level values of the pixels.

13. The method of claim 11, wherein determining the weightings comprises:
computing partial weightings for a first set of pixels of the one or more pixels based at least in part on first brightness level values of the first set of pixels being greater than a threshold value; and
assigning full weightings to a second set of pixels of the one or more pixels based at least in part on second brightness level values of the second set of pixels being less than the threshold value.

14. The method of claim 11, further comprising:
determining first brightness level values of a first set of pixels of the one or more pixels are greater than a threshold value; and
based on the first brightness level values being greater than the threshold value, computing a set of the weightings for the first set of pixels based at least in part on ratios between the threshold value and the first brightness level values.

15. A system comprising:
a computing device including one or more processing devices to perform operations including:
determining adjustments to pixel values of one or more pixels of a first image based at least on signal-to-noise ratio (SNR) values of the one or more pixels;
computing one or more channel values of a color from at least one illuminant of the first image for at least the one or more pixels based at least on applying the adjustments to the pixel values;
determining one or more color gain values of the first image based at least on the one or more channel values; and
generating image data representative of a second image using the one or more color gain values.

16. The system of claim 15, wherein the computing device captures the first image as a multiple-exposure high dynamic range (HDR) image.

17. The system of claim 15, wherein the SNR values of the one or more pixels are determined by brightness level values of the one or more pixels.

18. The system of claim 15, wherein at least a first set of SNR values of the SNR values of a first set of pixels of the one or more pixels are a function of first brightness level values of the first set of pixels.

19. The system of claim 15, wherein determining the adjustments comprises:
assigning partial weightings to a first set of pixels of the one or more pixels based at least in part on first SNR values of the first set of pixels being greater than a threshold SNR value; and
assigning full weightings to a second set of pixels of the one or more pixels based at least in part on second SNR values of the second set of pixels being less than the threshold SNR value.

20. The system of claim 15, wherein the computing device is of an autonomous vehicle that generates the image data from the one or more color gain values of the first image and uses the image data to form inputs to one or more neural networks to produce outputs used to control the autonomous vehicle.

* * * * *